UNITED STATES PATENT OFFICE.

HANS MARTIN, OF VIENNA, AUSTRIA-HUNGARY.

FOODSTUFF CONTAINING FREE LECITHIN AND PROCESS OF MAKING SAME.

1,150,691. Specification of Letters Patent. Patented Aug. 17, 1915.

No Drawing. Application filed March 28, 1914. Serial No. 827,814.

*To all whom it may concern:*

Be it known that I, Dr. HANS MARTIN, a subject of the Emperor of Austria-Hungary, residing at Vienna, Austria-Hungary, have invented a new and useful Foodstuff Containing Free Lecithin and Process of Making Same, of which the following is a specification.

The present invention relates to a foodstuff containing lecithin in a form in which it will readily be absorbed and assimilated, and to the method of preparing such a material.

Yolks of eggs although they contain a high percentage of lecithin cannot be used as lecithin foodstuff because lecithin occurs in the yolks of eggs predominantly combined with vitellin (phospho-protein) and this compound is decomposed in the process of digestion without a separation of the therapeutically active lecithin. Food stuffs which contain lecithin in an effective form are therefore generally prepared in such manner that the lecithin is obtained from the eggs or other raw materials in as pure a state as possible and is then mixed with suitable vehicles such as biscuit powder, chocolate, sugar or the like. It is true that by this means preparations of a permanent character and exact dosage can be obtained, but the process is very expensive and the products are therefore too expensive for general utility.

The present invention enables lecithin products to be obtained more cheaply.

The process consists in the liberation of the lecithin by the addition of small quantities of alcohol while heating to about 80° for a short time, and without previous separation of the lecithin from the remaining constituents of the yolk of egg. The mass resulting after distilling off the alcohol, which is preferably done *in vacuo*, is mixed with sugar or other suitable vehicles, if desired with the addition of flavoring substances and dried at a moderate heat. In this manner also, owing to the fact that the substance of the eggs still has sufficient binding power, biscuits and sweetmeats of the shape of butterscotch and the like may be directly manufactured.

The use of alcohol for separating lecithin is known *per se*, but alcohol has always heretofore been used only for the purpose of subsequent extraction of lecithin (after the liberation of the same from the compounds in which it exists) in order to examine the latter analytically or to obtain it in a pure state. The fact that the yolk of egg broken up by alcohol directly should be of therapeutic value is a new discovery.

As an example of the manufacture of the new preparation, 10 yolks of eggs are vigorously beaten up first alone and then with the addition of 250 cc. of 96% alcohol and then the mixture is heated for about half an hour to about 80° C. Thereupon the alcohol is distilled off to such an extent that a mass having the consistency of a thick sludge remains which is thoroughly mixed with 200 grams of powdered sugar, some chocolate powder and vanilla, and then pressed into sticks or rolled into slabs which are quickly dried at a moderate baking heat.

It will be obvious that in place of alcohol other harmless substances or completely removable substances capable of breaking up the yolk of egg may be used.

I claim:

1. In the process of preparing foodstuffs containing free lecithin, the step which consists in treating egg-yolk with a solvent capable of liberating lecithin from its compounds, without separation of the lecithin from the remaining constituents of the egg-yolk.

2. In the process of preparing foodstuffs containing free lecithin, the step which consists in treating egg-yolk with alcohol, without separation of the lecithin from the remaining constituents of the egg-yolk.

3. In the process of preparing foodstuffs containing free lecithin, the step which consists in treating egg-yolk with alcohol, distilling off the alcohol to such an extent that a pasty mass remains, adding a body building substance thereto, and drying at a moderate heat.

4. As a new product, a food-stuff containing a dry mixture of egg-yolk in which the whole of the lecithin is in a free state and a body-building vehicle.

DR. HANS MARTIN.

Witnesses:
JOSEPH C. STADLER,
KARL GRUBER.